UNITED STATES PATENT OFFICE.

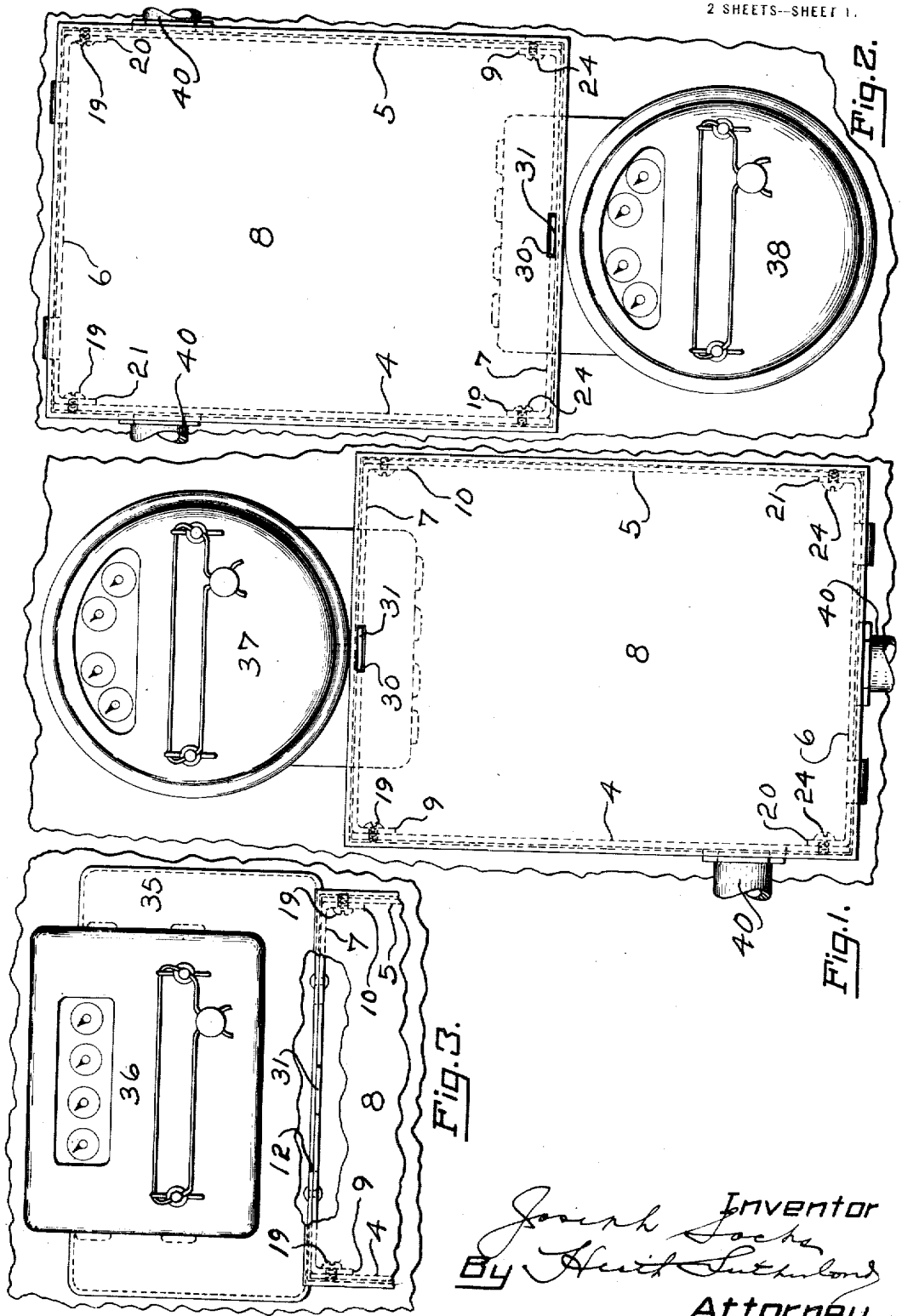

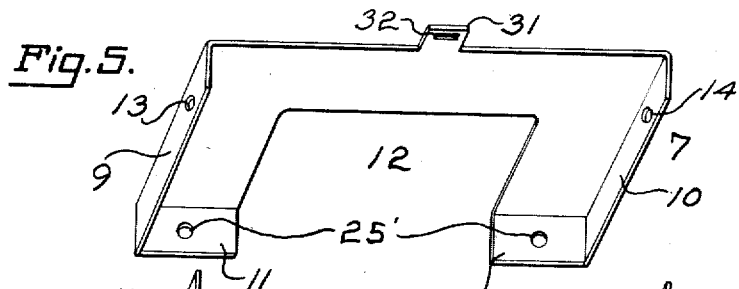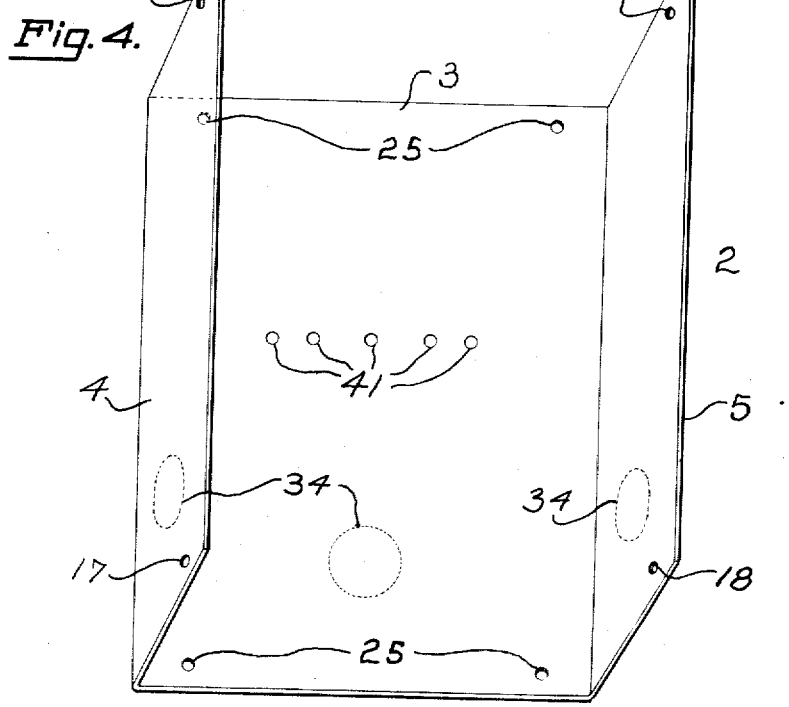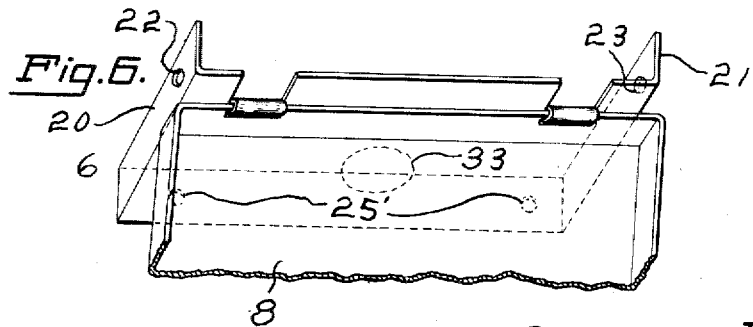

JOSEPH SACHS, OF HARTFORD, CONNECTICUT.

CONVERTIBLE ELECTRIC-APPLIANCE-RECEIVING BOX.

1,296,323.  Specification of Letters Patent.  Patented Mar. 4, 1919.

Application filed July 26, 1916. Serial No. 111,386.

*To all whom it may concern:*

Be it known that I, JOSEPH SACHS, a citizen of the United States, residing at Hartford, in the county of Hartford and State of Connecticut, have invented certain new and useful Improvements in Convertible Electric-Appliance-Receiving Boxes, of which the following is a specification.

This invention relates to what I shall for convenience term a "convertible electric-appliance-receiving box." As may be inferred this box or cabinet may receive a switch, cut out, meter testing instrumentalities or any other medium or mediums. The primary object of the invention is to provide an article of this kind for association with a meter or meters, which can readily be arranged to conform to the location of the meter or meters and will afford the necessary protection to the meter as well as the appliance or appliances in the box.

In the drawings accompanying and forming part of the present specification I have shown in detail one convenient form of embodiment of the invention which will be set forth fully in the following description. I do not restrict myself to this disclosure; I may depart therefrom in several respects within the scope of the invention defined by the claims following said description.

Referring to said drawings:

Figure 1 is a front elevation of a meter-installation involving a box comprising the invention.

Fig. 2 is a like view wherein the meter is below the box instead of being above it as in Fig. 1.

Fig. 3 is a view of the upper portion of an installation illustrating an adapter in coöperative relation with one end of the box.

Fig. 4 is a perspective view of the body of a box.

Fig. 5 is a like view of an end plate.

Fig. 6 is a similar view of another end plate with the front or cover connected therewith.

Like characters refer to like parts throughout the several views.

The box comprises in its construction a body portion made up of the main member 2 and illustrated in detail in Fig. 4, and two end members or plates 6 and 7, shown respectively by Figs. 6 and 5. This main portion comprises a back 3 and complemental sides 4 and 5 which may as illustrated be in the form of flanges bent from the back and disposed in parallelism with each other or practically so. These end members or portions of the wall of the body are interchangeable, for instance the end member 7 may close one open end of the body 2, or it may close the other, and the same thing applies to the member 6, these members being like the body generally of sheet metal. Preferably connected in some suitable way with one of these end members, such as the end members 6, is a member as 8 which as shown constitutes the front or cover of the box. The member 7 as represented has parallel end flanges 9 and 10 and a back flange 11. Said member also has a slot as 12 which cuts through the back flange 11 and this slot 12 is advantageously utilized to receive the terminal chamber or other suitable part of a meter. These flanges 9 and 10 are adapted to fit between the flanges 4 and 5 at either end of the box, said flanges 9 and 10 having holes as 13 and 14 adapted to register with either the holes 15 and 16 in the sides 4 and 5 near one end of the box body or to register respectively with the holes 17 and 18 in said sides near the opposite end of said box body, suitable fastenings such as screws 19 being provided to connect the end member 7 to the box body. The end member 6 has end flanges 20 and 21 perforated as at 22 and 23, the perforations 22 and 23 being adapted to register with either the perforations or holes 15 and 16 or 17 and 18 respectively. If the member 7 be connected with that part of the body 2 shown as being uppermost in Fig. 4, it follows that the screws 19 will extend through the registering perforations 13 and 15 and 14 and 16 respectively, and in this event like screws as 24 are utilized conveniently for connecting the part 6 to the body and will extend through the registering perforations 22 and 17 and 23 and 18 respectively. In the construction shown the screw openings in the end members are plain, while the holes in the body are threaded to receive the threaded portions of the screws. For additional security the back 3 may have perforations or holes as 25 arranged as shown in pairs near its opposite ends, each pair of holes 25 being adapted to receive the back screws connecting the end members 6 and 7 with the back 3. Said back screws are intended to extend through holes 25' in the end members and also support the box or cabinet.

The two members 6 and 7 are interchangeable, and the means by which they are mounted are in the organization illustrated, of duplicate character. While these two members 6 and 7 present what I have considered the ends of the box, it will be clear that they need not necessarily present the top or bottom or vice versa, for the body 2 may stand horizontally, and in this event either the wall 4 or the wall 5 might constitute the top or conversely.

In addition to the elements already described the box comprises a front or cover as 8, and this may be connected to one of the end members for instance the end member 6. This connection may be of any desirable kind, although a hinge joint is a convenient one as illustrated. When the front or cover is closed as illustrated in Figs. 1, 2 and 3, the slot 30 in the free end of said cover may receive the projection or lip 31 on the front edge of the member 7, the extending portion of the said projection or tongue 31 or that part which projects beyond the front face of the cover when the latter is closed, having a slot 32 which may receive a suitable seal.

I have illustrated as will be gathered merely one of several organizations involving the invention. This one, as well the others, subserves the important function of acting as an electric appliance receiving or containing box or cabinet and a meter adapter or having a meter adapter portion in itself. That is to say, the structure presents a self-contained cabinet and meter adapter. The construction of this self-contained cabinet and meter adapter is such that the meter may be placed in different positions relatively to the cabinet and the conductors leading to and from the cabinet may be disposed so as to enter and leave from such sides as the conditions of the particular installation may require. I consider a wall or part as 7 as a meter adapter member and a part or wall as 6 as a blank end member or wall. By using the term blank to designate this form of end member or wall, I do not mean to imply that this kind of wall member is entirely blank. It may be provided with openings or apertures or knock-outs to permit of conductors entering and leaving through this part of the complete cabinet. However, the form of end member or wall like 6 is called a blank wall in contradistinction to the name applied to the end member or wall 7, because it is not intended to serve as a meter adapter end wall or member. Said part 6 is shown having a hole or aperture or knock out 33, to which may be connected a suitable conduit pipe in the well-known manner or said hole may receive a bushing. The body is similarly equipped as at 34 with knock outs, so that conduit pipes or bushings may be suitably connected at any of these points.

In Figs. 1, 2 and 3 I have shown several arrangements. In Fig. 1 for illustration the member 7 is shown at the top of the body 2, and the member 6 at the bottom, whereas in Fig. 2 this arrangement is exactly reversed. In Fig. 3 the box is arranged as shown in Fig. 1, but instead of directly carrying the meter, it sustains an adapter as 35. In this event the slot 12 constitutes a wire way for the wires from the box to the terminals of the meter 36.

In Fig. 1 a meter 37 of a certain style with a bottom connected terminal chamber is located above the cabinet. In Fig. 2 a meter 38 of another style with a top connected terminal chamber is located below the cabinet. In either case, however, the terminal chamber of the meter projects inside of the cabinet and through the aperture like 12 of the member or plate 7. It may be that the same cut or slot in this plate 7 will fit the two terminal chambers, but it is intended that plates like 7 or meter adapting plates or end walls, which is the same thing, will be provided with different forms of cuts or slots, so that these slots or cuts will suitably conform to the different contours of different terminal chambers of meters.

In Fig. 3 the meter as 36 as shown has no top or bottom terminal chambers but is of the side wire type. Consequently the adapter 35 is necessary in order to cover up the terminals and the wires leading therefrom to the cabinet. This adapter 35 is of a general form well-known in the art, but it is secured or suitably associated with an end wall like 7 or one of equivalent nature; for instance instead of using a meter adapting end wall like 7 with its slot or cut, I may use an end wall which merely has an aperture through it.

I have stated above that members like 7 are meter adapter end walls or members, but I do not intend to imply that such meter adapter end walls must of necessity be provided with a notch or cut in all cases, but this, however, is a desirable construction. I have shown in Figs. 1, 2 and 6 a hinge connection between the front or cover 8 and the end wall member 6, while I have shown a sealing stud which projects through the cover on the member 7. It will be obvious that the front or cover of the cabinet may be otherwise secured to the body and the end walls. For instance the hinge or equivalent form of connection may be on the end wall of member 7 and the sealing connection may be on the member 6 or if desired the cover may be held in any other well-known and convenient manner.

I have already drawn attention to the holes or knock outs appearing in the end wall or member 6 and in the back and side flanges of the body 2. These apertures or preferably knockouts are for the purpose of connecting suitable conduit pipes or bushings at the points noted, for the entrance or exit of suitable wires or conductors into the cabinet. In Figs. 1 and 2 I have denoted by 40 suitable conduit pipes connected at different points of the cabinet and its end walls or members.

Obviously when the installation requires the use of what is specifically known as an adapter, of which that designated by 35 is an illustration, such part can be connected to the meter adapter end wall in any desirable manner, or it may form a unitary part with the end wall.

While I have termed the article a convertible electric appliance receiving box, this as I have already noted, was for convenience. In reality the device herein shown and described is a self-contained meter adapter cabinet. This cabinet as stated may serve for example meter adapting purposes, but it is preferably arranged to also serve so that electrical connecting appliances such as those mentioned, may be mounted therein, and when so arranged the cabinet forms in its complete entity a protective housing and casing not only for the appliances mounted therein but also for the meter associated therewith. I have shown in Fig. 1 in the back 3 of the body certain apertures 41 which are adapted to receive screws or other suitable fastenings by which the connecting appliances in the cabinet are held in place in any suitable relation thereto.

I desire to call attention to the fact that the box has a compartment the back of which has means to support an electric circuit controlling device, the wall portion of the box having an opening to receive a part of a meter for the projection of said meter part into the compartment containing said circuit controlling device. The compartment of the box is obviously the space surrounded by the walls, back and front or cover. The back of the box has a row of perforations 41 which in the present case present a simple means for attaching to the back the electric circuit controlling device which may in the particular installation, be used in the compartment. I have mentioned the fact that what I have considered the back of the box has a row of perforations or openings. This is as will be clear a structure which has met my conditions in a satisfactory manner. There may be instances where the body of the box has no back and wherein the electric circuit controlling device is naturally not fastened to the back but to the support of the box whatever it may be or otherwise suitably arranged, which support is then in reality the back of the box.

What I claim is:

1. An electric appliance receiving box having back and wall portions, said back being provided with means to support an electric device and the wall portion having a removable element constituting a direct part of the box and also constituting a meter adapting element.

2. A self-contained meter adapting cabinet provided with a body, a cover, and a removable meter adapting end wall constituting a direct part of the cabinet, said cabinet having means to receive a circuit controlling appliance therein.

3. A self-contained meter adapting cabinet provided with a body and a cover portion, and a removable end wall constructed to permit a meter to project within the cabinet, said end wall constituting a direct part of the cabinet and the latter having means to receive a circuit controlling appliance therein.

4. An electric appliance receiving cabinet comprising a body portion having a back and sides, a cover, and a removable wall provided with a cut to conform to the outline of that part of the meter projecting into the box.

5. A box provided with interchangeable members constituting at the same time direct parts of the box, one of said members being provided with means to adapt it to function as a meter adapter element.

6. A box provided with interchangeable wall members, one of which is notched to receive the terminal chamber of a meter, said wall members constituting at the same time direct parts of the box.

7. A box provided with interchangeable members, one of which constitutes a meter adapter element, and a cover for the box, connected with one of said members.

8. An electric appliance receiving box having a body portion comprising a back and sides, end members removably and interchangeably placeable at the open ends of said body portion and in correlation with said sides, one of said end members constituting a meter adapting end member.

9. A box having a compartment to receive an electric circuit controlling device, a portion of the walled part of the box having an opening to receive a part of an electric meter for the protective projection of said meter part into said compartment containing said circuit controlling device, the box having a front closing said compartment and the meter extending into the box independently of the front.

10. A box having a compartment to receive an electric circuit controlling device, a portion of the walled part of the box having an opening to receive a part of an electric meter for the protective projection of said meter part into said compartment containing said circuit controlling device, the box having a back provided with means for the support thereon of said electric circuit controlling device and also having a front closing said compartment, and the meter extending into the box independently of said front.

11. A box comprising a body having a back and sides and open ends, removable end walls coöperatively associable with said body at the open ends thereof, a cover provided with means for its connection and sealing in operative relation, one of said end members being provided with means in itself for protective relationship with a meter, a portion of which meter projects within the box and through the aforesaid member.

12. A box comprising a body having a back and sides and open ends, end wall members bridging at the open ends of the body between the sides, means for interlocking the end wall members with the sides, a cover member in coöperative association with said body and end members, sealing means for holding said cover member in coöperative association, and means forming a direct part of one of said end members for permitting a portion of a meter to project within the box.

13. In a self-contained meter adapting cabinet, a body portion comprising a back and sides and open ends, a meter adapting end wall for one of said ends, and a blank end wall for the other, means for securing said end walls to the body, said means being constructed so as to permit of the interchangeable positioning of said end walls to said body.

In testimony whereof I affix my signature in the presence of two witnesses.

JOSEPH SACHS.

Witnesses:
L. L. MARKEL,
HEATH SUTHERLAND.